Nov. 19, 1963   D. W. MILLER ETAL   3,111,299
ROTARY PLUG VALVE
Filed Sept. 13, 1960

INVENTORS
Donald W. Miller
Alick Clarkson
BY *Hastings Ackley*
ATTORNEY

United States Patent Office 3,111,299
Patented Nov. 19, 1963

3,111,299
ROTARY PLUG VALVE
Donald W. Miller, 1609 Rankin Highway, Midland, Tex., and Alick Clarkson, Paul Spur, Douglas, Ariz.
Filed Sept. 13, 1960, Ser. No. 55,635
3 Claims. (Cl. 251—175)

This invention relates to valves and more particularly to valves provided with a flow passage and having a plug extending through the flow passage and provided with a transverse flow port for controlling flow of fluids through the flow passage of the valve body.

An object of the invention is to provide a valve which may be installed in a flow conductor whose operative elements may be removed for inspection or repair without disconnecting the valve from the flow conductor.

Another object is to provide a new and improved valve having a plug, provided with a transverse flow port, which is rotatable and movable laterally in the valve body into sealing engagement with valve seats disposed oppositely of the plug.

Still another object of the invention is to provide a valve wherein the upstream pressure of the fluid, when the plug is in closed position in the valve body, tends to move the plug into fluid-tight engagement with the valve seat on the downstream side of the valve body.

Another object of the invention is to provide a valve having a body in which are disposed a plug and seats engageable with the plug which are both floating and self aligning and which will engage each other in a fluid-tight manner due to the fluid pressure of the fluid whose flow the valve controls regardless of the distortion of the various elements constituting the valve.

A further object of the invention is to provide a valve having a rotatable plug whose transverse flow port is placed in communication with the flow passage of the flow conductor when the plug is rotated to an open position and out of communication with the flow passage of the flow conductor when the plug is rotated to a closed position, displaced angularly from its open position, wherein the plug is self aligning with respect to seats of the valve with which it is engageable.

A still further object of the invention is to provide a valve having a body connectable in a flow conductor and a plug rotatable in the body between open and closed positions to control the flow of fluids through the flow conductor and the valve body, the plug having a flow port therethrough alignable with a flow passage of the valve body, wherein the flow passage of the valve body is smaller in cross-sectional area than the flow passages or bore of the flow conductor whereby the area of the plug exposed to the pressure of the fluid on the upstream side of the valve when the valve is closed is reduced to minimize the force required to rotate the valve.

Another object is to provide a valve having a pair of seats disposed in the valve body oppositely of the plug wherein the plug and valve seat are self aligning under the upstream pressure of the fluid whose flow is controlled by the valve.

Additional objects and advantages of the invention will be readily apparent from the reading of the following description of devices constructed in accordance with the invention, and reference to the accompanying drawings thereof, wherein.

Figure 1:
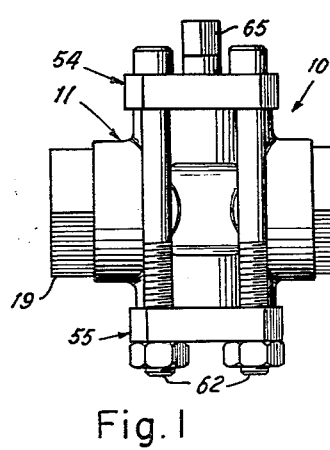
FIGURE 1 is a side view of the valve embodying the invention.

Referring now particularly to FIGURES 1 through 5 of the drawings, the valve 10 includes a body 11 having a longitudinal flow passage 12 and a transverse bore 13 which intersects the longitudinal flow passage. The body is internally threaded on opposite sides of the transverse bore 13, as at 14 and 15, for engaging the reduced exteriorly threaded portions 17 and 18 of the bushings 19 and 20, respectively. Inward movement of the reduced portions of the bushings 19 and 20 is limited by the engagement of their annular stop shoulders 24 and 25 with the annular shoulders 26 and 27, respectively, of the body. If desired any suitable spacer means or shims may be interposed between these shoulders. The bushings are provided with concave seating surfaces 27 and 28 whose configurations correspond to the convex outer seating surfaces 30 and 31 of the removable valve seats 33 and 34, respectively.

The valve seats 33 and 34 are provided with flow passages 35 and 36, respectively, which are of the same diameter as the reduced portions 38 and 39 of the bores or flow passages of the bushings 19 and 20, respectively. The seats 33 and 34 are provided with inner seat surfaces 40 and 41 which are disposed in the transverse bore 13 of the body so that the cylindrical outer surfaces of the plug 45 contact the inner seat surfaces of the valve seats which hold the plug out of contact with the internal surfaces of the body defining the transverse bore 13.

The flow port or passage 46 of the plug 45 is of the same diameter as the flow passages of the valve seats and the reduced portions 38 and 39 of the flow passages of the bushings 19 and 20. This diameter may be smaller than the diameter of the bore or flow passage of the sections 50 and 51 of the flow conductor which are threaded in the outer ends of the bushings. The bushings, the valve seats and the valve plug form a venturi which increases the velocity of fluid flowing through the valve during its passage through the valve to minimize the loss of pressure of the fluid in the well flow conductor on opposite sides of the valve due to the restriction in the effective orifice of the valve. Since the flow passages of the valve seats are of relatively small cross-sectional area, the pressure to which the valve plug is subjected by the fluid on the upstream side of the valve body is of a smaller value than if these flow passages were of the same diameter as the effective bore of the flow sections 50 and 51 and thus reduces the force needed to be applied to the valve plug to rotate it between its closed and open positions.

The plug 45 is maintained in proper alignment in the transverse bore 13 of the body so that its flow passage 46 is in alignment with the flow passages of the bushings and of the valve seats by a pair of bonnets 54 and 55 which have annular bosses 56 and 57, respectively, which telescope into the transverse bore of the valve body at opposite ends thereof. Their movement into the transverse passage is limited by the engagement of the stop surfaces 57 and 58 of the bonnets with the oppositely outwardly facing stop surfaces 59 and 60, respectively, of the valve body. The bonnets are held in the telescoped positions illustrated in the drawings by a plurality of bolts 62 which extend through aligned apertures in the bonnets. The bolts 62 may extend exteriorily of the valve body as shown or the valve body may be provided with transverse apertures disposed outwardly of the transverse bore 13 through which the bolts may extend.

The bonnets are provided with bore 63. An operating handle 65 extends into the body 11 through the bore of the upper bonnet and is provided with an elongate lug 66 which is received in an upwardly openly elongate recess 67 of the valve plug. The length of the lug 66 is smaller than the length of the recess 67 so that movement of the valve plug may take place relative to the operating handle 65 along the longitudinal axes of the recess 67 and lug 66. The width of the lug 66 however is substantially equal to the width of the recess 67 so that substantially no movement of the plug may take place relative to the operating handle perpendicularly relative to the longitudinal axis of the recess and of the lug.

The bore 63 of the upper bonnet 54 is enlarged at its inner end to receive the intermediate external flange 68 of the operating handle whereby the engagement of the annular shoulders 69 and 70 of the upper bonnet and of the flange, respectively, prevents outward displacement of the operating handle 65. The upper end of the operating handle may be square in order that it may be engaged by a suitable wrench by means of which rotation of the operating handle and therefore of the valve plug may be effected. The longitudinal axis of the slot 67 extends perpendicularly to the longitudinal axis of the flow passage 46 of the valve plug so that the handle does not restrain movement of the valve plug toward one or the other of the valve seats 33 or 34 when the valve plug is in its closed position wherein the longitudinal axis of the flow passage of the plug extends perpendicularly to the longitudinal axes of the flow passages of the valve seats so that movement of the valve plug 45 towards either of the valve seats may take place only when the valve plug is rotated 90 degrees from the open position illustrated in FIGURES 2 and 3 to a closed position.

The reduced portions 56 and 57 of the upper and lower bonnets 54 and 55, respectively, are provided with external recesses in which are disposed O-rings 72 and Teflon backup rings 73 which prevent extrusion of the O-rings outwardly of the external grooves due to fluid pressure within the valve. The internal ends of the bonnets are also provided with inwardly opening annular recesses in which are disposed the O-rings 74 and Teflon backup rings 75. The O-rings 73 and 74 prevent flow of fluids from the valve upwardly between the valve bonnets and the valve body through the transverse passage 13 thereof and also prevent fluid flow between the valve plug and the bonnet through the bores 63 of the bonnet. The bore of the lower bonnet 55 serves as a bleed hole and is packed with felt 77 or other suitable material to keep dirt from the interior of the valve body.

If desired, O-rings 80 and 81 may be disposed about the valve plug on opposite sides of its flow passage which are engaged by the seats to prevent leakage if the upstream pressure of the fluid is so low as to be not sufficient to hold the valve plug in fluid-tight engagement with the valve seat on the downstream side of the valve. Alternatively O-rings 82 and 83 may be disposed in external recesses to seal between the bushings 19 and 20 and the body.

In use, the valve plug is assembled as illustrated in the drawing and connected to adjacent ends of the sections 50 and 51 of a flow conductor whose fluid flow the valve is to control. When it is desired to permit flow of fluids through the valve, the valve plug is rotated in the transverse bore 13 to the open position illustrated in FIGURES 1 and 3 wherein its flow passage 46 is aligned with the flow passages 35 and 36 of the valve seats. Since the diameter of the flow passages of the reduced portions of the bushings, of the seats and of the valve plug may be smaller than the diameter of the bore of the flow conductor, these flow passages create a venturi effect which increases the velocity of the fluids flowing through these passages between the sections 50 and 51, the velocity of the fluid decreasing once it has flowed from the reduced bore of a plug to a downstream section. As a result there is no loss in pressure of the fluid flowing through the valve. The various O-rings prevent flow of such fluid from the valve body through the opposite ends of the transverse bore 13. The pressure of the fluid of course is not now effective to displace the plug toward either valve seat since the plug 66 of the operating handle is disposed transversely relative to the flow passages of the valve seats and prevents movement of the valve plug toward either seat.

When it is desired to close the valve to prevent flow of fluids through the flow conductor, the operating handle 65 is engaged by a suitable wrench and rotated through 90 degrees in either direction. Such rotation of the valve plug causes its flow passage to be moved out of alignment with the flow passages of the valve seats and moves the elongate recess 67 and lug 66 of the operating handle into alignment with the central or longitudinal axes of the valve seats. As a result, the pressure of the fluid acting from the upstream side of the valve which, for example, is from the left if the fluid is flowing toward the flow conductor section 51 from the flow conductor section 50, acts on the plug and tends to move it toward the valve seat 34. The valve plug is now free to move laterally in the transverse bore 13 of the body since the lug 66 is of shorter length than the recess 67 and the external diameter of the plug is smaller than the diameter of the transverse bore 13. As a result, the fluid pressure acting on the valve plug forces the valve plug into fluid-tight engagement with the cylindrical seating surface 40 of the valve seat 34. The convex surface 31 of the valve seat 34 is of course simultaneously forced into fluid-tight engagement with the concave surface 48 of the bushing 20. As a result, no fluid may seep or flow between the valve plug and the valve seat or between the valve seat and the bushing into the downstream flow conductor section 51.

It will be noted that the greater the pressure of the fluid on the upstream side of the valve, the greater the force forcing the sealing surfaces of the valve seat, of the valve plug and of the bushing toward sealing engagement with one another since the plug is movable relative to the valve seat and the valve seat is of course somewhat movable in the convex recess 28 of the valve bushing 20. The seat and the valve plug thus align themselves automatically to effect fluid-tight sealing engagement relative to one another.

Figure 2:
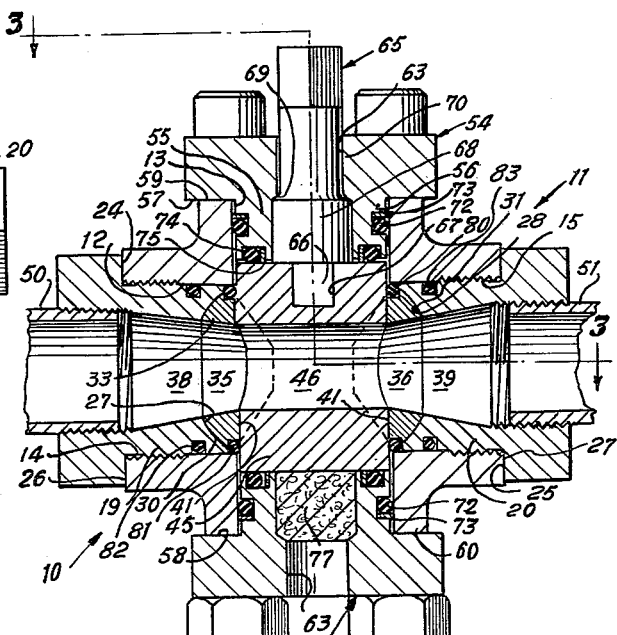
FIGURE 2 is a vertical sectional view taken on line 2—2 of FIGURE 3.
Figure 4:
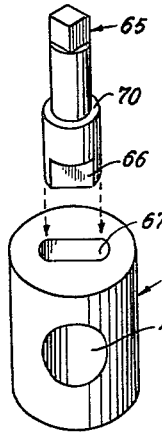
FIGURE 4 is an exploded view of the valve plug and its operating handle.
Figure 3:
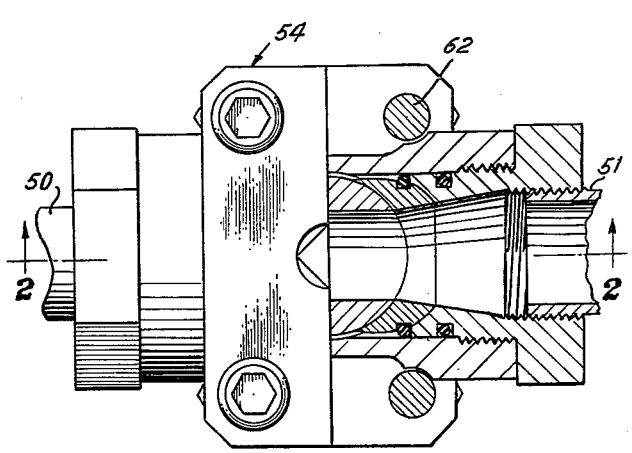
FIGURE 3 is a sectional view taken on line 3—3 of FIGURE 2.

It will be apparent that if the flow conductor section 51 is on the upstream side of the flow conductor and the flow conductor section 50 is on the downstream side, the valve plug will be moved in the opposite direction to the left as seen in FIGURE 2 toward the valve seat 33 to move the convex surface 30 of the valve seat 33 into fluid-tight engagement with the concave seating surface 27 of the bushing 19 and at the same time moves its own cylindrical surface into fluid-tight sealing engagement with the cylindrical surface 40 of the valve seat 33.

It will thus be apparent that the seats 33 and 34 and the valve plug align themselves as dictated by the action of the pressure of the fluid on the upstream side of the valve, whenever the plug is rotated to its closed position, to effect a fluid-tight seal between the valve seat, the bushings and the valve plug which prevents any flow of fluid through the valve.

It will further be seen that the bushings may be regarded as removable portions of the body so that the valve seats may be considered as a means for sealing between the valve body and the valve plug to prevent flow of fluid through the body when the plug is in closed position.

It will further be seen that since the plug and the valve seats are movable relative to the valve body, any distortion of the valve body, the valve plug or the valve seats which might otherwise cause the operative elements of the valve to bind and thus make the valve inoperative, will not cause malfunction of the valve, since these elements are free to move or align themselves as required by such distortion.

It will further be seen that the valve plug never contacts any portion of the valve body itself and is in contact only with the valve seats and with the various O-rings which are formed of a resilient substance and therefore do not prevent movement of the valve plug into alignment with the valve seats.

It will also be seen that the operative elements of the valve may be removed for inspection or repair while the valve body remains connected to the flow conductor sections by unscrewing the nuts off the bolts 62 and removing the bonnets, the plug and then the valve seats are removable, together with the various O-rings and backup rings, through either end of the transverse bore 13 of the body.

It will further be apparent that the pressure of the fluid on the upstream side of the valve is employed to provide the force necessary to ensure a positive fluid-tight seal between the valve plug and the valve seats and the opposite downstream side valve seat.

It will further be apparent that various changes may be made in the structural details of the valve without departing from the invention. For example, the concave seating surfaces 27 and 28 of the bushings may be narrowed so that the convex outer seating surfaces 30 and 31 of the removable valve seats 33 and 34 would engage narrow surfaces of the bushings almost along a line. In addition, if desired, O-rings may be provided between the bushings and the outer surfaces 30 and 31 of the removable valve seats 33 and 34 to provide the desired sealing effect instead of the metal to metal sealing contact illustrated in the drawings. It will also be seen that, if desired, either the concave seating surfaces 27 and 28 of the bushings or the outer seating surfaces 30 and 31 of the removable valve seats 33 and 34 may be serrated to cause binding and sealing engagement between these surfaces.

Figure 6:
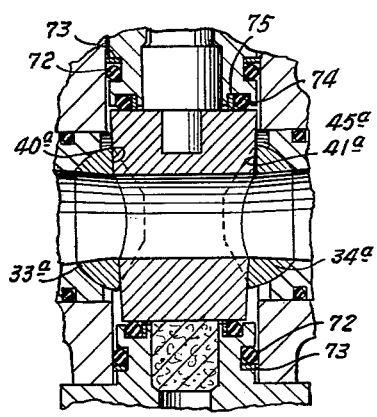
FIGURE 6 is a fragmentary sectional view showing a modified form of the valve.
Figure 5:
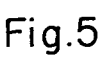
FIGURE 5 is a perspective view of one of the removable seats of the valve.

In FIGURE 6 is illustrated a modified form of the valve wherein the valve plug 45a is of tapered or conical configuration instead of the cylindrical configuration of valve 10. The valve seats 33a and 34a are provided with seat surfaces 40a and 41a, respectively, which conform to the configuration of the outer surface of the tapered valve plug 45a. In all other respects the valve illustrated in FIGURE 6 has the same structure and functions in the same manner as valve 10.

It will further be seen that the valve embodying the invention is simple in design, easy to manufacture, has the ability to hold pressure even when loosely assembled and can be formed of substances which resist the corrosive effects of such fluids as ceramics and ceramets.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A valve including: a body having a passage and a bore extending perpendicular to and intersecting said passage; a plug disposed in said bore, said plug having a flow passage; a pair of opposed annular seat means in said passage of said body on opposite sides of said bore and extending into said bore toward each other, said seat means having annular seat surfaces for sealingly engaging the outer surface of said plug; a pair of holding means releasably rigidly secured to said body and extending into opposite ends of said passage of said valve body for securing said seat means against outward displacement in said passage of the body, said seat means and said holding means having aligned flow passages, said plug being rotatable in said bore about an axis perpendicular to said flow passages of said seat means between an open position wherein said flow passage of the plug is in alignment and communication with the flow passages of said seat means and a closed position wherein the flow passage of the plug is disposed transversely of the flow passages of the seat means and out of communication therewith, each of said seat means and the holding means securing it against outward displacement having co-engageable annular arcuate seal surfaces located in said passage of said body outwardly of said bore for sealing therebetween about the flow passages of the seat means and the holding means; means releasably secured to said body at opposite ends of said bore and extending inwardly into opposite ends of said bore and engageable with opposed surfaces of the plug for holding the plug in operative position in the body, said plug being removable through either selected end of said bore upon release of the releasable means at such selected end from said body; and operator means extending through one of said releasable means and engageable with the plug for rotating the plug between said closed and open positions, the operator means permitting movement of the plug in said bore in a direction parallel to the direction of flow through said flow passages of said seat means when said plug is in its closed position whereby upstream pressure of the fluid whose flow is controlled by said valve is effective to move the plug toward a downstream seat means to cause said co-engageable surfaces of the downstream seat means and the holding means and the seat surface of the downstream seat means the outer surface of the plug to be forced into fluid tight sealing engagement with one another.

2. The valve of claim 1, wherein said flow passages of said seat means and said holding means increase in diameter in opposite directions outwardly of opposite ends of the flow passage of the plug when the plug is in open position.

3. The valve of claim 1, wherein one of said operator means and said plug has lug means and the other of said operator means and said plug has a recess, said lug extending into said recess whereby rotation of said operator means about an axis parallel to the direction of said plug causes rotation of said body, said recess extending transversely relative to the flow passage of said plug, said lug being shorter in length transversely relative to the flow passage of said plug than the length of said recess transversely relative to the flow passage of said plug.

References Cited in the file of this patent

UNITED STATES PATENTS

| | | |
|---|---|---|
| 1,784,381 | O'Stroske | Dec. 9, 1930 |
| 1,924,325 | Kramer | Aug. 29, 1933 |
| 2,433,732 | Brown | Dec. 30, 1947 |
| 2,547,831 | Mueller | Apr. 3, 1951 |
| 2,606,740 | Allen | Aug. 12, 1952 |
| 2,645,448 | Bugg | July 14, 1953 |
| 2,856,150 | McDonald | Oct. 14, 1958 |
| 2,885,179 | Hartmann | May 5, 1959 |
| 2,945,666 | Freeman | July 19, 1960 |
| 2,986,374 | Rakus | May 30, 1961 |
| 3,039,484 | Bredtschneider | June 19, 1962 |